Patented Mar. 11, 1947

2,417,151

UNITED STATES PATENT OFFICE 2,417,151

COMPOSITION OF MATTER WITH A SCENT OF AMBRETTOLIDE AND PROCESS OF MAKING SAME

Charles Collaud, Geneva, Switzerland, assignor to Givaudan-Delawanna Inc., New York, N. Y., a corporation of New Jersey No Drawing. Application April 25, 1942, Serial No. 440,474. In Switzerland May 2, 1941

11 Claims. (Cl. 260—344)

This invention relates to a novel composition of matter having an ambrettolide-like scent, and to a novel process for making the same.

A process for making large-ringed lactones of the general formula

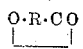

is described in my prior United States Patent No. 2,234,551. According to the process therein disclosed, an ester of an hydroxy-carboxylic acid of the general formula $HO \cdot R \cdot CO \cdot OR'$ is heated in the presence of a functional group exchange catalyst. The ester used is derived from an alcohol which distills at a temperature above 100° C. under a pressure of 2 mm. of Hg. The process is conducted in such a manner that the lactones are removed from the reaction chamber as soon as they are formed.

In the general formula recited above and in my aforesaid patent, R represents a branched or unbranched chain of more than five carbon atoms, including in some instances an ether linkage in the chain. In the formula there given for the reagent esters, R' always represents the radical of a mono- or poly-hydroxy alcohol volatile above 100° C. under a pressure of 2 mm. of Hg and stable at the temperature at which the transformation into a large-ringed lactone is to be effected.

The physical and chemical conditions set forth in the aforementioned patent are such that it was not possible to foresee that the process therein described could also be employed for the transformation of esters of hydroxy-acids of the same general formula $HO \cdot R \cdot CO \cdot OR'$ given above, but in which R represents a branched or unbranched chain having more than five carbon atoms and at least one double bond.

Thus, I have subsequently discovered, that contrary to all expectations, such unsaturated esters can be satisfactorily converted into large-ringed lactones.

According to the instant invention, esters of the general formula $$HOCH_2(CH_2)_x CH=CH(CH_2)_y COOR'$$

in which $x+y=12$ and R' complies with the conditions stated above, are transformed into a composition of matter having the scent of ambrettolide, and comprising a mixture of unsaturated isomeric large-ringed lactones having the general formula

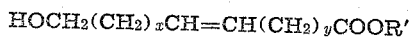

in which $x+y=12$. The reactant unsaturated esters may be obtained by esterifying 6,16-dihydroxy-palmitic acid $$HOCH_2(CH_2)_9CH(OH)(CH_2)_4COOH$$

and dehydrating the ester thus formed by treatment with sodium acid sulfate according to the method of Ufer, U. S. Patent No. 1,892,258, granted December 27, 1932; or of Senderens and Aboulenc, Compt. rend. 190, 150–152 (1930); or the aforesaid acid may be dehydrated in any other conventional way, as, for example, according to the method of Fokin, J. Russ. Phys. Chem. Soc. 46, 224–26 (1914).

The lactones which I obtain are isomers of ambrettolide, the scent principle of ambrette seeds, except for the lactone in which $x=5$ and $y=7$, which substance is identical with natural ambrettolide. Kerschbaum (Ber. Deutsche Chem. Gesellschaft, vol. 60, page 902 and ff. (1927) has shown that ambrettolide possesses the following constitutional formula:

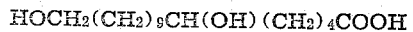

The subject of the present invention is therefore a new industrial product having the scent of ambrettolide, and comprising a mixture of unsaturated large-ringed lactones isomeric with natural ambrettolide, said mixture being a colorless liquid having a strong ambrettolide-like odor, distilling entirely between 118° and 120° C. under a pressure of 0.25 mm. of Hg, having a density of 0.960 at 20° C., a refractive index $n_D^{20}=1.480$, a saponification number equal to 220.4, and suitable for use in the perfume industry.

The present invention also includes a process for making the aforesaid composition of matter. According to this process, a mixture of esters of unsaturated isomeric hydroxy-acids of the general formula $$HO \cdot CH_2 \cdot (CH_2)_x \cdot CH=CH \cdot (CH_2)_y \cdot CO \cdot OH$$

where $x+y=12$, is prepared, for example, from 6,16-dihydroxy-palmitic acid, and said mixture of esters is heated in the presence of a functional group exchange catalyst to convert the same into lactones.

This process is particularly distinguished by the facts (a) that the alcohol formed from at least a part of the esters of the said mixture is an alcohol which distills under a pressure of 2 mm. Hg at temperatures above 100° C., and (b) that the lactones are removed from the reaction chamber in the shape of vapours as soon as they are formed.

Said alcohol may be mono- or polyhydroxy; it may be for example glycerol; it is sufficient that it fulfills the volatility conditions indicated above and, of course, that it is stable at the reaction temperature. Internal ethers of polyvalent alcohols, such as poly-ethylene glycols can also be used.

An inert constituent, i. e., one which does not react in the formation of the lactone and which is not altered by the reaction conditions, but which promotes the elimination of the lactone, may be added to the reaction medium. This inert constituent may precisely be the said alcohol.

The catalyst may be a classic catalyst permitting exchange of functional groupings between esters, or between esters and alcohols, particularly an alkaline catalyst. The sodium derivative of the alcohol comprised in the composition of the ester is, of course, quite indicated; for example, the sodium derivative of glycerol may be employed.

In the practical execution of the process, an apparatus may be used which permits the separation by decantation, extraction or otherwise of the two products condensed from the distillate, and the return of the alcohol to the reaction chamber. The reaction medium can also be supplied with alcohol as the latter is eliminated therefrom.

The reaction is preferably conducted under reduced pressure, which varies according to the nature of the alcohol formed and the temperature of reaction. The temperature need not exceed 200° C., or even 150° C. for that matter. It is selected to obtain rapid reaction without decomposition of the desired products.

The following example illustrates a specific embodiment of my invention. It is distinctly to be understood, however, that the details recited therein are included to make the disclosure as complete as possible, and not to limit the scope of the invention.

*Example*

Sodium 6,16-dihydroxy-palmitate is condensed with 1-chloro-propanediol-(2,3) to form the glycerol mono-ester, for example by the methods of Romburgh, P., Rec. Trav. Chem. 1, 186 (1882), Guth, F., Zeit. Biol. 44, 78 (1903), or Kraft, F., Ber. 36, 4339-44 (1903). The ester thereby obtained is treated with sodium acid sulfate according to the method of Ufer, U. S. Patent No. 1,892,258, granted December 27, 1932; or of Senderens and Aboulenc, Compt. rend. 190, 150-152 (1930), thereby producing a mixture of unsaturated isomeric glycerol mono-esters.

17.8 grams (0.05 mol) of this mixture of isomeric esters is charged into a distilling apparatus together with a solution of 0.3 grams of sodium in 30 cc. of glycerol and distillation is carried out under a pressure of 3 mm. of Hg until the temperature reaches 200° C. The distillation is then carried on under a pressure of 3 mm. of Hg by gradually adding glycerol to the reaction medium in order to maintain the temperature at about 200° C. The operation is interrupted at the end of 10 hours. The distillate is extracted with ether and decanted. The ethereal solution is washed with water, and the solvent is eliminated. The residue (10 to 11 grams) consists of a colorless oil which is purified by distillation.

In this manner more than 8 grams of a colorless liquid with a strong scent of ambrettolide is obtained, which liquid consists of a mixture of unsaturated isomeric large-ringed cyclic lactones having the general formula:

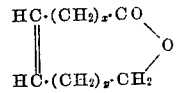

in which $x+y=12$.

This liquid distills entirely between 118° and 120° C. under a pressure of 0.25 mm. of Hg. It is further characterized by a density of 0.960 at 20° C. and by a refractive index $n_D^{20}=1.480$. Its saponification number is 220.4 (computed value: 222). Its chemical analysis furnishes the following results: per cent C, 76.14; per cent H, 11.22. Computed for $C_{16}H_{28}O_2$: per cent C, 76.12; per cent H, 11.19.

The product thus obtained finds its main application in perfumery.

From the foregoing, it is apparent that a new composition of matter comprising a mixture of isomers of ambrettolide and possessing the same kind of scent as ambrettolide itself, may be obtained by the application of the process of the present invention.

The above example is given purely for purposes of illustration, and it is obvious that various modifications thereof may be made without departing from the scope of my invention.

What I claim is:

1. A new composition of matter having an ambrettolide-like odor, comprising a mixture of unsaturated large-ringed lactones isomeric with ambrettolide, said mixture being a colorless liquid which distills entirely between 118° and 120° C. under a pressure of 0.25 mm. of Hg, and which has a density of 0.960 at 20° C., a refractive index $n_D^{20}=1.480$, and a saponification number equal to 220.4.

2. As a new composition of matter, a perfume material having a strong ambrettolide-like odor and comprising a liquid mixture of synthetic ambrettolide and synthetic lactones isomeric therewith, said liquid being characterized by substantially the following constants:

Index of refraction at 20° C_____ 1.480
Density at 20° C_____grams per cc__ 0.960
Saponification number_____ 220.4
Distillation range at a pressure of 0.25 mm.
  of mercury_____ 118°–120° C.

3. A mixture of synthetic isomeric lactones each having the formula

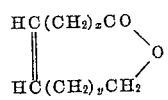

in which $x+y=12$.

4. A process for making a new composition of matter having the scent of ambrettolide, which comprises preparing a mixture of esters derived from unsaturated isomeric hydroxy-acids of the general formula

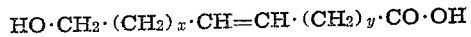

(wherein $x+y=12$) and an alcohol which distills above 100° C. at a pressure of 2 mm. of mercury, heating said mixture of esters in the presence of a functional group exchange catalyst to convert said esters into lactones, and removing said lactones from the reaction medium as soon as they are formed.

5. A process according to claim 4, in which the esters are glycerol mono-esters.

6. A process according to claim 4, in which the catalyst is an alkali metal alcoholate.

7. A process according to claim 4, in which the catalyst is a sodium derivative of glycerol.

8. A process according to claim 4, in which the mixture of esters is heated at a temperature of about 200° C.

9. A process according to claim 4, in which an inert constituent is added to the reaction medium in order to promote the elimination of the lactones.

10. The process of making a substitute for natural ambrettolide from 6,16-dihydroxy-palmitic acid, which comprises the steps of dehydrating the latter to produce a mixture of isomeric unsaturated monohydroxy acids, converting said mixture into a mixture of the corresponding sodium salts, condensing said mixture with 1-chloro-propanediol-(2,3) to form a mixture of glycerol mono-esters, and heating said mixture of esters in the presence of a functional group exchange catalyst to convert said esters into a mixture of isomeric lactones.

11. The process of making a synthetic composition having the odor of natural ambrettolide, which comprises dehydrating 6,16-dihydroxy-palmitic acid to produce a mixture of isomeric unsaturated monohydroxy acids having the general formula $HOCH_2(CH_2)_xCH=CH(CH_2)_yCOOH$ (wherein $x+y=12$), forming esters therefrom of an alcohol which distills above 100° C. at a pressure of 2 mm. of mercury, and heating said esters in the presence of a functional group exchange catalyst to form a mixture of isomeric lactones.

CHARLES COLLAUD.

REFERENCES CITED

The following references are of record in the file of this patent:

UNITED STATES PATENTS

| Number | Name | Date |
|---|---|---|
| 2,202,437 | Stoll | May 28, 1940 |
| 2,234,551 | Collaud | Mar. 11, 1941 |
| 1,972,340 | Helwig et al. | Sept. 4, 1934 |
| 1,830,618 | Pasternack | Nov. 3, 1931 |

FOREIGN PATENTS

| Number | Country | Date |
|---|---|---|
| 440,416 | British | Dec. 23, 1935 |
| 449,217 | German | Sept. 17, 1927 |

OTHER REFERENCES

Chem. Abstracts, vol. 29, page 2148.
Berichte, vol. 60, pages 902–4.
Berichte Der Deutschen Chemischen Gesellschaft, vol. 60, page 902.